Oct. 4, 1938.     H. TOFTE     2,132,058
SODA FOUNTAIN STRAW JAR WITH CLIP
Filed Jan. 15, 1937
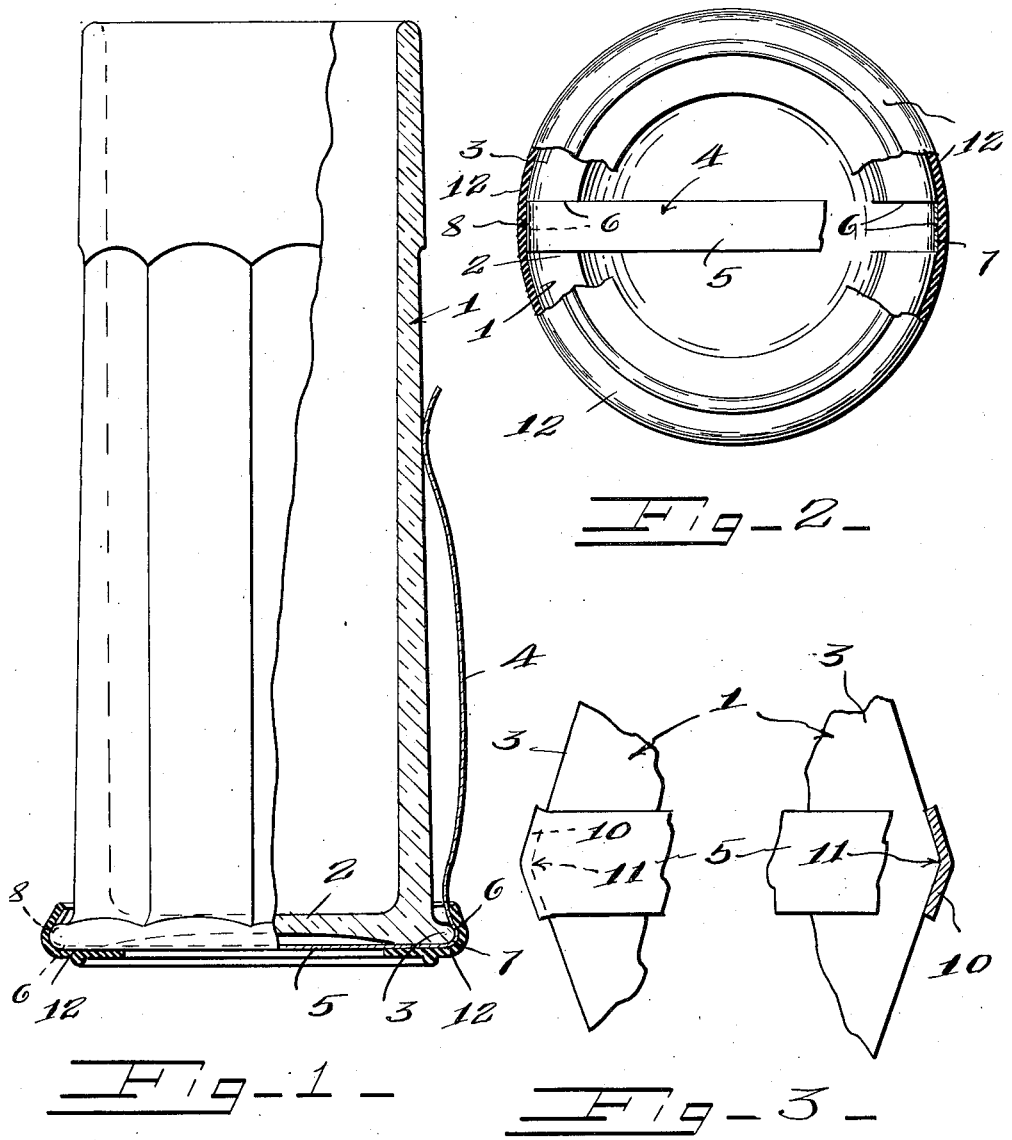
Fig-1-   Fig-2-   Fig-3-
INVENTOR.
Harold Tofte
BY Bodell & Thompson
ATTORNEYS.

Patented Oct. 4, 1938

2,132,058

UNITED STATES PATENT OFFICE 2,132,058

SODA FOUNTAIN STRAW JAR WITH CLIP

Harold Tofte, Syracuse, N. Y., assignor to T. N. Benedict Manufacturing Company, East Syracuse, N. Y., a corporation of New York Application January 15, 1937, Serial No. 120,765

4 Claims. (Cl. 40—11)

This invention relates to containers having clips for removably holding articles on the outside of the container, as for instance, jars used on soda fountains for holding straws within the container and articles, as a menu card or napkins, on the outside of the container, and has for its object a particuarly simple clip and manner of attaching it to the container.

It further has for its object a spring clip consisting of an upright resilient clip or tongue member pressing toward the periphery of the jar or container and having a single transverse base strip extending diametrically of the bottom of the container on the outside thereof, and having means at the ends of the single transverse strip coacting with diametrically opposite points on the base of the container to secure the clip to the container, in contradistinction to a plurality of strips arranged at angles to each other.

The invention consists in the novel features and in the combinations and constructions hereinafter set forth and claimed.

In describing this invention, reference is had to the accompanying drawing in which like characters designate corresponding parts in all the views.

Figure 1 is an elevation, partly broken away, of a container or jar provided with the clip forming the subject matter of this invention.

Figure 2 is an inverted end view.

Figure 3 is a view similar to Figure 2 of a modified form of the invention.

1 designates a container, that here shown being suitable for holding straws, the container being cylindrical in general form and having a base 2, the rim 3 of which extends outwardly beyond the circle of the cylindrical wall of the container. The container here shown is polygonal with approximately ten sides instead of being exactly cylindrical.

In the form shown in Figures 1, 2, however, the rim 3 of the base is circular. In the form shown in Figure 3, the rim is shown as having a polygonal peripheral edge.

4 designates the clip, this extending vertically upwardly along the side of the jar or container 1 and being resilient and shaped to press near its upper end toward the periphery of the jar or container 1 for the purpose of holding a menu card, napkins, or other articles. The clip also has a single base strip 5 extending diametrically of the base of the jar or container and the clip having means at the opposite ends of the transverse base strip for coacting with the rim 3 to hold the clip from lateral and circumferential displacement. As here shown, the clip and the rim of the base are formed with means at the opposite ends of the transverse bar for interlocking. In Figures 1 and 2, this means is shown as depressions or notches 6 formed in diametrically opposite portions of the rim for receiving angular portions at the juncture of the clip and the transverse strip and at the ends of the transverse strip.

As here illustrated, the transverse strip is formed with portions 7 and 8 at opposite ends of the transverse strip for extending into the notches and hooking over the rim and snapping into the notches, so as to grip the rim, the snapping action being due to the resiliency of the clip.

As seen in Figure 3, the rim may be formed polygonal or with diametrically opposite portions thereof angular and the clip at the ends of the transverse bar formed angular in cross section, as at 10, to conform to the diametrically opposite angles of the base. The angular formation of the clip provides sockets for receiving the apex portions of diametrically opposite angles at 11 of the base.

In either form of the invention, the clip with the single transverse base strip is held from displacement. Usually, a ring 12 of non-metallic material, as rubber, encircles the clip at the ends of the transverse base strip.

What I claim is:—

1. The combination with a container having a base, of a clip for holding an article on the outside of the container, the clip extending vertically along the outer wall of the container and having a single transverse strip extending diametrically of the base on the lower side thereof and clamping on the base at diametrically opposite points, the base being formed with diametrically opposite marginal peripheral notches and the clip interlocking in the notches at the opposite ends of the transverse strip.

2. The combination with a substantially cylindrical container having a base formed with a rim extending beyond the circle of the cylindrical wall of the container, of a clip for holding an article on the outside of the container, the clip extending vertically along the outer wall of the container and pressing toward the same and having a single transverse strip extending diametrically of the base on the lower side thereof, 50 the clip having means at opposite ends of the transverse strip for hooking over diametrically opposite portions of the rim, the rim being formed with notches for receiving said hooking over portions.

3. The combination with a substantially cylindrical container having a base formed with a rim extendng beyond the circle of the cylindrical wall of the container, of a clip for holding an article on the outside of the container, the clip extending vertically along the outer wall of the container and pressing toward the same and having a single transverse strip extending diametrically of the base on the lower side thereof, the clip having means at opposite ends of the transverse strip for hooking over diametrically opposite portions of the rim, the rim and the clip having coacting means at opposite ends of the transverse strip for interlocking and preventing the clip from displacement.

4. The combination with a container having a base element, circular in general form; of a clip element for holding an article on the outside of the container, the clip element extending vertically along the outer wall of the container and having a single transverse strip extending diametrically of the base element on the lower side thereof, the clip element and the base element having coacting interfitting means at opposite ends of the strip to hold the strip from lateral and circumferential displacement, said interfitting means including notches in one of said elements and portions on the other of said elements extending into the notches.

HAROLD TOFTE.